(12) United States Patent
Wang et al.

(10) Patent No.: US 10,315,570 B2
(45) Date of Patent: Jun. 11, 2019

(54) IMAGE PROCESSING APPARATUS AND IMAGE PROCESSING METHOD

(71) Applicant: DENSO CORPORATION, Kariya, Aichi-pref. (JP)

(72) Inventors: Bingchen Wang, Kariya (JP); Muneaki Matsumoto, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 202 days.

(21) Appl. No.: 14/910,464

(22) PCT Filed: Jul. 30, 2014

(86) PCT No.: PCT/JP2014/003994
§ 371 (c)(1),
(2) Date: Feb. 5, 2016

(87) PCT Pub. No.: WO2015/019579
PCT Pub. Date: Feb. 12, 2015

(65) Prior Publication Data
US 2016/0176344 A1 Jun. 23, 2016

(30) Foreign Application Priority Data
Aug. 9, 2013 (JP) .................................. 2013-166292

(51) Int. Cl.
*B60R 1/00* (2006.01)
*H04N 5/232* (2006.01)
(Continued)

(52) U.S. Cl.
CPC ................ *B60R 1/00* (2013.01); *B60R 11/04* (2013.01); *G06K 9/00791* (2013.01); *G06K 9/52* (2013.01);
(Continued)

(58) Field of Classification Search
CPC .. B60R 1/00; B60R 11/04; G06T 7/70; G06T 7/60; G06T 5/006; G06T 2207/30252;
(Continued)

(56) References Cited

U.S. PATENT DOCUMENTS

| | | | | |
|---|---|---|---|---|
| 4,258,979 A | * | 3/1981 | Mahin | G02B 5/10 359/868 |
| 6,717,712 B2 | * | 4/2004 | Lynam | B60R 1/082 248/549 |

(Continued)

FOREIGN PATENT DOCUMENTS

| | | |
|---|---|---|
| EP | 1 298 000 A2 | 4/2003 |
| JP | 2003-111070 A | 4/2003 |

(Continued)

OTHER PUBLICATIONS

International Search Report and Written Opinion dated Nov. 4, 2014 in the corresponding International Application No. PCT/JP2014/003994.

*Primary Examiner* — Sathyanaraya V Perungavoor
*Assistant Examiner* — Philip P. Dang
(74) *Attorney, Agent, or Firm* — Knobbe, Martens, Olson & Bear, LLP

(57) ABSTRACT

An image processing apparatus extracts, as a display image, a part of an image captured by a wide angle camera, the wide angle camera being arranged at a position deviated from a vehicle center line that is a center line of a vehicle in a longitudinal direction and being configured to increase a degree of size reduction of an object as being farther from a center of the captured image. The image processing apparatus includes a control circuit that extracts the display image. The control circuit includes an extraction determination portion. The extraction determination portion determines an extraction position of the display image in the captured image according to a center position of the display (Continued)

image to the vehicle center line and the degree of size reduction of the object represented at a pixel of a specific position in the display image.

9 Claims, 9 Drawing Sheets

(51) Int. Cl.
- *B60R 11/04* (2006.01)
- *G06K 9/00* (2006.01)
- *G06K 9/52* (2006.01)
- *G06T 5/00* (2006.01)
- *G06T 7/60* (2017.01)
- *H04N 5/262* (2006.01)
- *G06T 7/70* (2017.01)

(52) U.S. Cl.
CPC .............. *G06T 5/006* (2013.01); *G06T 7/60* (2013.01); *G06T 7/70* (2017.01); *H04N 5/23229* (2013.01); *H04N 5/23238* (2013.01); *H04N 5/23293* (2013.01); *H04N 5/2628* (2013.01); *G06T 2207/30252* (2013.01)

(58) Field of Classification Search
CPC .. G06K 9/52; G06K 9/00791; H04N 5/23238; H04N 5/23293; H04N 5/2628; H04N 5/23229

See application file for complete search history.

(56) References Cited

U.S. PATENT DOCUMENTS

| | | | | |
|---|---|---|---|---|
| 7,590,310 B2* | 9/2009 | Retterath | ............. | G06K 9/3233 382/190 |
| 7,825,952 B2* | 11/2010 | Ito | ............. | B60R 1/00 348/148 |
| 7,934,843 B2* | 5/2011 | Lynam | ............. | B60R 1/08 359/866 |
| 8,058,980 B2* | 11/2011 | Yanagi | ............. | B60R 1/00 340/435 |
| 8,246,170 B2* | 8/2012 | Yamamoto | ............. | G02B 26/101 345/8 |
| 8,335,352 B2* | 12/2012 | Lee | ............. | G06K 9/00818 382/104 |
| 8,358,207 B2* | 1/2013 | Lenneman | ............. | B60K 35/00 340/425.5 |
| 8,427,395 B2* | 4/2013 | Seder | ............. | G01S 13/723 345/7 |
| 2002/0191078 A1* | 12/2002 | Okamoto | ............. | B60R 1/00 348/148 |
| 2005/0162442 A1* | 7/2005 | Baba | ............. | G06K 9/00711 345/612 |
| 2006/0026017 A1* | 2/2006 | Walker | ............. | G06Q 10/00 701/31.4 |
| 2006/0092277 A1 | 5/2006 | Ito | | |
| 2006/0206246 A1* | 9/2006 | Walker | ............. | G06Q 10/00 701/16 |
| 2008/0164985 A1* | 7/2008 | Iketani | ............. | G01S 7/4802 340/435 |
| 2008/0166024 A1* | 7/2008 | Iketani | ............. | B60R 1/00 382/107 |
| 2008/0199050 A1* | 8/2008 | Koitabashi | ............. | B60R 1/00 382/107 |
| 2010/0053320 A1* | 3/2010 | Chen | ............. | G06K 9/52 348/135 |
| 2010/0253489 A1* | 10/2010 | Cui | ............. | G01S 13/723 340/425.5 |
| 2010/0302564 A1* | 12/2010 | Ozawa | ............. | G06K 15/1849 358/1.9 |
| 2011/0013021 A1* | 1/2011 | Hongo | ............. | B60R 1/00 348/148 |
| 2011/0164789 A1* | 7/2011 | Robert | ............. | G06K 9/00798 382/104 |
| 2011/0216194 A1* | 9/2011 | Kosaki | ............. | H04N 7/18 348/148 |
| 2012/0072080 A1* | 3/2012 | Jeromin | ............. | B60Q 1/143 701/49 |
| 2012/0236024 A1 | 9/2012 | Fujii et al. | | |

FOREIGN PATENT DOCUMENTS

| | | |
|---|---|---|
| JP | 2005-86279 A | 3/2005 |
| JP | 2013-002820 A | 6/2011 |
| JP | 2012-156672 A | 8/2012 |
| WO | 2008/117386 A1 | 10/2008 |
| WO | 2015/019579 A1 | 2/2015 |

* cited by examiner

Gh

P1

Gh

P2

IMAGE PROCESSING APPARATUS AND IMAGE PROCESSING METHOD

CROSS REFERENCE TO RELATED APPLICATION

This application is based on Japanese Patent Application No. 2013-166292 filed on Aug. 9, 2013, the disclosure of which is incorporated herein by reference.

TECHNICAL FIELD

The present disclosure relates to an image processing technology generating a display image that is displayed to an occupant of a vehicle, from an image captured by a camera that is installed to the vehicle.

BACKGROUND ART

A system supports a driving operation of a driver by installing cameras as imaging devices on vehicles and displaying images, which are captured by the cameras, on a display device. In many systems, wide angle cameras are used and are capable of imaging wide ranges at one time.

When a system supports driving by displaying a captured image of a rear view from a vehicle, for example, it may be difficult to intuitively recognize a relationship between vehicle motion and a change in the display image when a wide angle camera is arranged at a position that is deviated from a center line of the vehicle in a longitudinal direction. Thus, a system that extracts a partial image, the center of which coincides with the center line of the vehicle in the longitudinal direction, from the image of the rear view from the vehicle, which is captured by the wide angle camera arranged at the position that is deviated from the center line of the vehicle in the longitudinal direction and displays the partial image has been proposed (referring to Patent literature 1).

The inventors of the present application have found the following regarding an image processing apparatus and an image processing method.

In an image captured by a wide angle camera, distortion of an object increases and a degree of size reduction of the object increases (that is, the object appears to have a smaller size) as going farther from the center of the image. When a part of the captured image is extracted and displayed as a display image, it may become more difficult for an occupant (a driver, for example) in a vehicle to recognize the display image when a part being farther from the center of the captured image is extracted. Since an object being farther from the center of the captured image is displayed in a smaller size when the extracted image is displayed without performing distortion correction, it may be difficult for the occupant in the vehicle to recognize the object. Even when the extracted image is displayed after distortion correction, an object being farther from the center of the captured image is enlarged by a larger enlargement factor in the distortion correction. An image with lower resolution may be obtained. Therefore, it may be difficult for the occupant in the vehicle to recognize the object. A region around the center line of the vehicle in the longitudinal direction may be farther distant from the center of the captured image and the above difficulty may become more serious when an installation position of the camera is more greatly deviated from the center line of the vehicle in the longitudinal direction.

PRIOR ART LITERATURES

Patent Literature

Patent literature 1: Japanese Patent No. 4512293

SUMMARY OF INVENTION

It is an object of the present disclosure to provide a technology for generating a display image, which can be easily recognized by an occupant in a vehicle, from an image captured by a wide angle camera arranged at a position that is deviated from a center line of the vehicle in a longitudinal direction.

According to an image processing apparatus and an image processing method of the present disclosure, an image processing apparatus and an image processing method that extract, as a display image, a part of an image captured by a wide angle camera that is arranged at a position deviated from a vehicle center line as a center line of a vehicle in a longitudinal direction and is configured to increase a degree of size reduction of an object as being farther from the center of the captured image, are provided. The image processing apparatus according to the present disclosure includes a control circuit that extracts a display image. The control circuit includes an extraction determination portion that determines an extraction position of the display image in the captured image according to a center position of the display image with respect to the vehicle center line and a degree of size reduction of an object, the degree of size reduction represented at a pixel of a specific position in the display image.

According to the image processing apparatus and the image processing method of the present disclosure, it may be possible to generate a display image that can be easily recognized by an occupant of a vehicle from an image captured by a wide angle camera arranged at a position deviated from a vehicle center line.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

An embodiment of the present disclosure will be explained with reference to the drawings.

Overall Configuration

Figure 1:
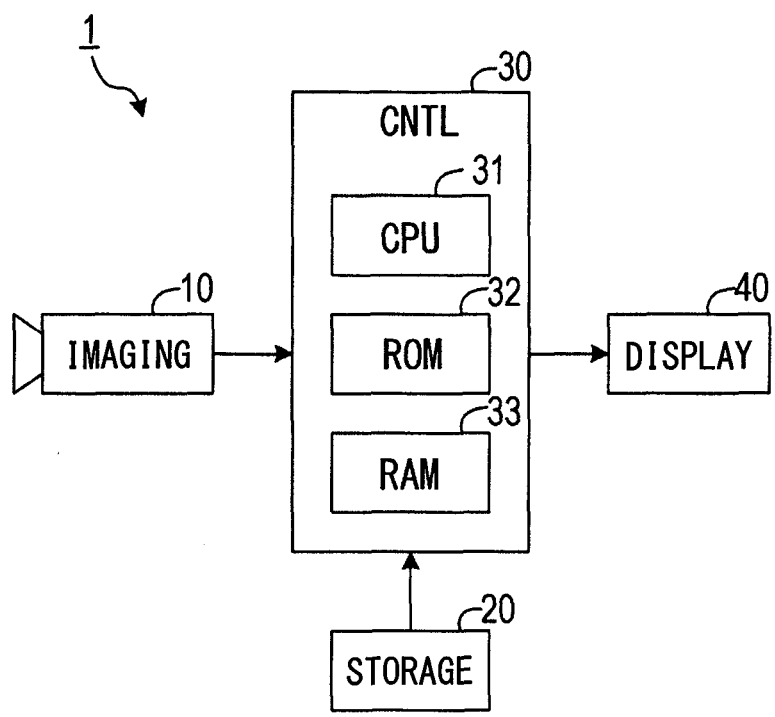
FIG. 1 is a diagram illustrating an outline configuration of an image processing system.

An image generation system 1 according to the present disclosure generates a display image that is to be displayed for an occupant (a driver, for example) of a vehicle from a captured image of a rear view of the vehicle. The image generation system 1 includes an imaging portion 10, a storage portion 20, a control circuit 30, and a display portion 40 as illustrated in FIG. 1. Incidentally, the control circuit 30 will be referred to as an image processing portion.

Figure 2A:
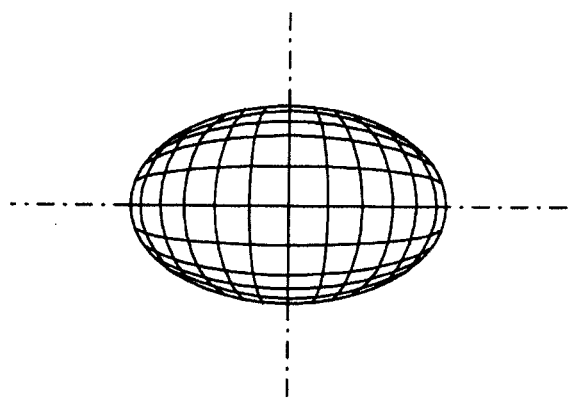
FIG. 2A is a diagram illustrating a distorted image that is captured by a wide angle camera.

The imaging portion 10 includes a wide angle camera (for example, a fisheye camera) that is capable of imaging at a view angle of about 180 degrees. In an image captured by the imaging portion 10, a degree of size reduction of an object increases and a size of the object decreases as going farther from the center of the captured image. The captured image is a distorted image that is distorted in a manner that the object appears to have a smaller size as going farther from the center of the captured image (referring to FIG. 2A). The object may also be referred to as a photographic subject.

It is supposed that a captured image as a distorted image in which distortion of an object increases as going farther from the center of the captured image is corrected to a regular image with no distortion. The size of the object in the regular image with respect to the size of the object in the distorted image denotes an enlargement factor. The enlargement factor increases as the degree of size reduction increases. Therefore, the enlargement factor increases as going farther from the center of the distorted image.

Figure 3A:
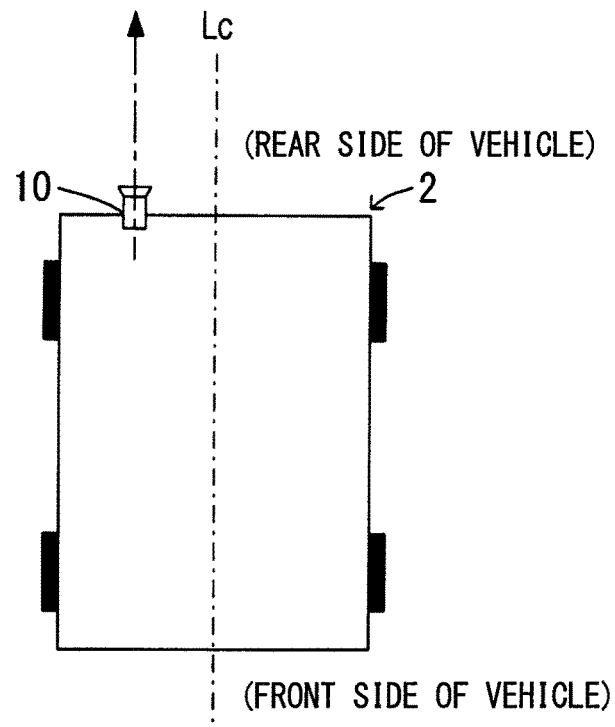
FIG. 3A is a diagram illustrating a camera parameter in a top view of a vehicle.
Figure 3B:
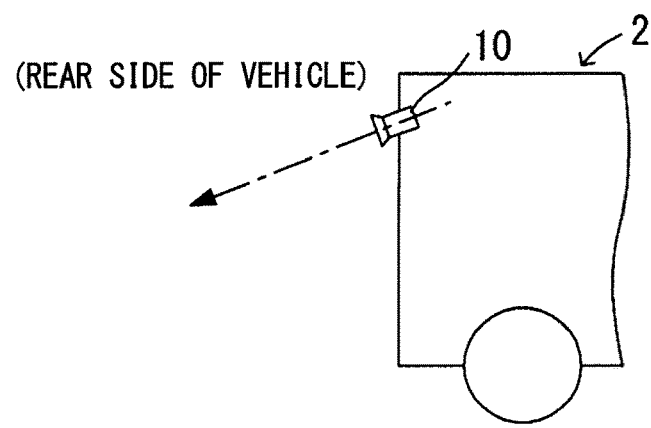
FIG. 3B is a diagram illustrating a camera parameter in a side view of a rear portion of the vehicle.

The imaging portion 10 is located at a position that is deviated from a center line (hereinafter, referred to as a vehicle center line) Lc of the vehicle 2 in a longitudinal direction, in a rear portion of the vehicle 2 as illustrated in FIG. 3A. The imaging portion 10 is located so as to image a lower portion in a rear region of the vehicle 2 as illustrated in FIG. 3B. Information of a coordinate position, a pitch angle, a yaw angle, and a roll angle of the imaging portion 10 in a three-dimensional space with reference to the vehicle 2 (specifically, a reference point in the vehicle 2) is stored as camera parameters in advance in the storage portion 20.

Figure 4:
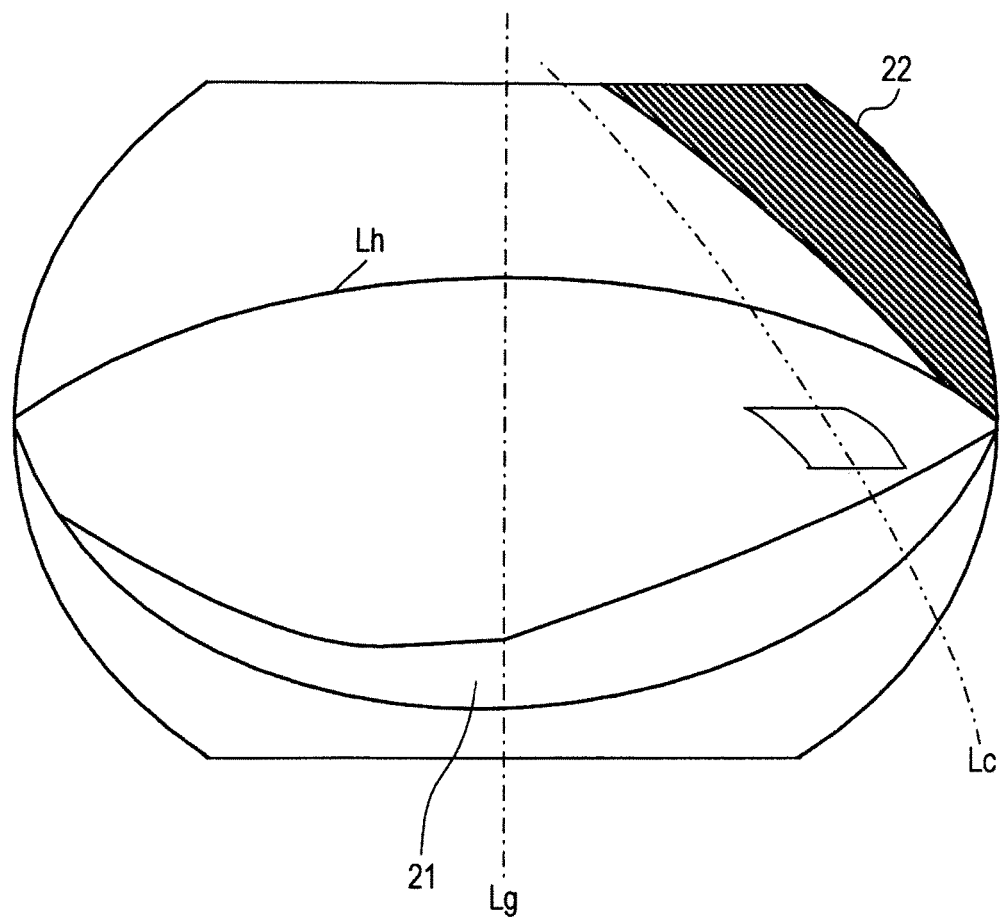
FIG. 4 is a diagram illustrating an example of a rear view captured image.

The imaging portion 10 outputs the captured image to the control circuit 30 at a predetermined frequency (for example, 60 frames per second). The captured image will be explained. As shown in FIG. 4, in an example of the captured image, a line Lh is a horizontal line, and a line Lg is a center line of the captured image (referred to as a captured image center line), which is orthogonal to a horizontal direction of the captured image. The line Lc is the vehicle center line that is the center line of a vehicle. Since the imaging portion 10 is arranged so as to be deviated from the vehicle center line Lc, the captured image center line Lg does not coincide with the vehicle center line Lc. In the present embodiment, a bumper 21 of the vehicle 2 appears on a front side, and a rear body 22 of the vehicle 2 appears on the right side in the captured image.

In FIG. 1, the storage portion 20 includes a storage device storing various kinds of data such as a program executed by the control circuit 30, the camera parameters, and 3D information indicating an outline shape of the vehicle.

The control circuit 30 includes a microcomputer including a CPU 31, a ROM 32, a RAM 33, an I/O, or the like. The control circuit 30 reads the program stored in the storage portion 20, and executes image generation processing of extracting, as a display image, a part of the image captured by the imaging portion 10.

The display portion 40 displays the display image generated by the control circuit 30 to the occupant in the vehicle. Specifically, the display portion 40 includes a display device for displaying an image to the occupant in the vehicle.

Processing

The image generation processing (also referred to as an image processing method) that is executed by the control circuit 30 (specifically, the CPU 31, for example) in accordance with the program will be explained with reference to a flowchart in FIG. 5. The image generation processing is repeatedly executed at a predetermined time interval (every time a captured image is output from the imaging portion 10 in the present embodiment) when a shift lever operated by the driver is at a reverse position (rearward traveling).

When the processing is started, the control circuit 30 obtains an image captured by the imaging portion 10 first in S100 (S represents a step or a section).

Figure 6:
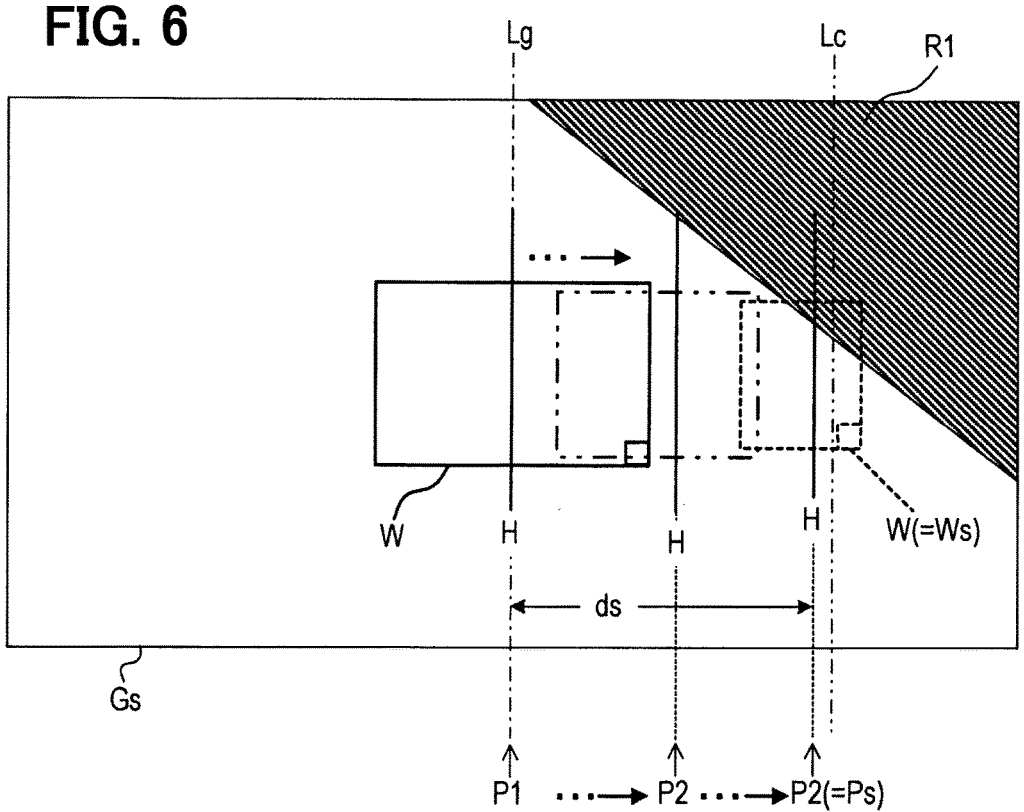
FIG. 6 is a diagram illustrating an extraction frame and an output frame in a captured image.

A vehicle appearance region is detected in S110. A region in which the subject vehicle (the rear body 22 as illustrated in FIG. 4, for example) appears in the captured image will be referred to as a vehicle appearance region. In this step, a vehicle appearance region R1 (referring to FIG. 6) is calculated based on the camera parameters stored in the storage portion 20 and the 3D information indicating the outline shape of the vehicle. The subject vehicle denotes a vehicle including the image generation system 1, and corresponds to the vehicle 2 in the present embodiment.

Incidentally, a flowchart disclosed in the present application or processing of the flowchart is configured of multiple sections (also referred to as steps), and each section is expressed in a manner such as S100. Furthermore, each section can be divided into multiple sub sections, and multiple sections can be combined into one section. Moreover, each section configured as described above may be referred to as a circuit, a device, a module, and means.

Each of the multiple sections or a combination thereof can be realized not only as (i) a software section combined with a hardware unit (a computer, for example) but also as (ii) a hardware section (an integrated circuit or a wired logic circuit, for example) while including or not including functions of the related devices. Furthermore, the hardware section can be configured to the inside of a microcomputer.

In S120, a position (specifically, a position of the center line of the display image) of an extraction frame W setting a range, from which a display image is extracted, in a captured image Gs in a horizontal direction of the captured image Gs is set at an initial position P1.

In the present embodiment, a region (for example, a square region behind the vehicle, which has a horizontal length of 6 m and a vertical length of 5 m around a portion just behind the vehicle), which should be included in the display image, in the rear region of the vehicle 2 is determined in advance. A range (also referred to as a display image angle that is narrower than an image angle of the wide angle camera) to be displayed as the display image is set to have an area over which an entire region can be displayed. Since the extraction frame W represents a portion, which is to be displayed as a display image, in the captured image Gs, the extraction frame W is set to have a size in accordance with the range to be displayed as the display image.

The initial position P1 is set so as to be located in a position that the center line of the display image (hereinafter, referred to as a display center line H) coincides with the captured image center line Lg. The extraction frame W is located at the center of the captured image Gs. At the initial position P1, the extraction frame W is horizontally symmetrical with respect to the captured image center line Lg. In the present embodiment, a position of the extraction frame W in a direction orthogonal to the horizontal direction (a vertical direction) is set at the center position of the captured image Gs in the vertical direction.

In S130, the display center line H is moved in the captured image Gs by an amount corresponding to a unit pixel (for example, one pixel) in the horizontal direction toward a side (the right side in the present embodiment) on which the center position of the display image approaches the vehicle center line Lc.

In the present embodiment, the size of the extraction frame W changes in accordance with the movement toward the side of the vehicle center line Lc in order to equalize a size of an actual object corresponding to an image included in the extraction frame W at each movement position. Specifically, the horizontal width of the extraction frame W decreases, and the right side of the extraction frame W to the display center line H is smaller than the left side every time the display center line H is moved toward the side of the vehicle center line Lc (the extraction frame W becomes horizontally asymmetrical with respect to the display center line H). This change in the shape of the extraction frame W in accordance with the movement in the horizontal direction can be calculated based on characteristics of a lens (for example, a fisheye lens) of the imaging portion (a wide angle camera) 10, and the characteristics of the lens are stored in advance in the storage portion 20. When the display center line H is specified, the size of the extraction frame W is specified.

In S140, it is determined whether an inverse number of an enlargement factor (1/an enlargement factor) of a pixel (a pixel at a lower end portion in the moving direction (a right bottom corner) in the present embodiment) at a specific position in the extraction frame W is less than a predetermined lower limit value (also referred to as an acceptable value) (that is, the inverse number is below the lower limit value). When the inverse number of the enlargement factor is less than the lower limit value, the processing proceeds to S160. When the inverse number of the enlargement factor is equal to or greater than the lower limit value, the processing proceeds to S150.

Incidentally, the enlargement factor is an enlargement factor (a ratio at which an object is expanded) on an assumption that the captured image Gs as a distorted image is converted into a regular image with no distortion. The enlargement factor increases as going farther from the captured image center line Lg as described above. The enlargement factor is determined based on the characteristics of the lens of the imaging portion (the wide angle camera) 10, and data thereof is stored in advance in the storage portion 20. When a position of a pixel in the captured image Gs is specified, an enlargement factor of the pixel is specified. The imaging portion 10 corresponds to the wide angle camera in the present disclosure.

When a position of the display center line H at the time the extraction frame W is moved from the initial position P1 in the horizontal direction by an amount corresponding to predetermined pixels denotes a movement position P2, an image in the extraction frame W at the movement position P2 includes a pixel with a larger enlargement factor as compared with the image in the extraction frame W at the initial position P1.

Figure 7:
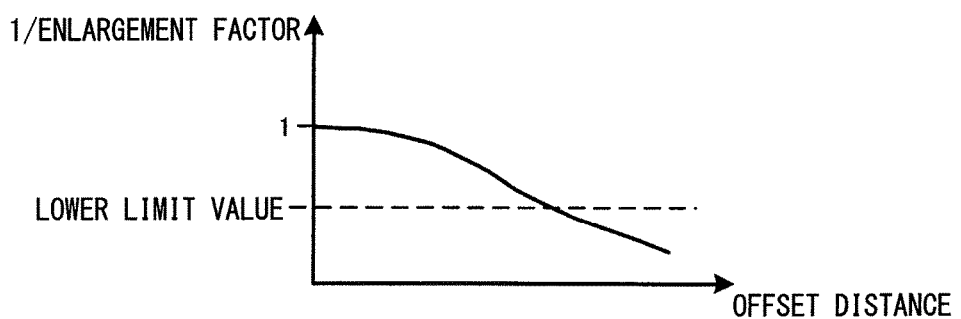
FIG. 7 is a diagram illustrating a relationship between an offset distance and an inverse number of an enlargement factor.

A distance of the display center line H from the initial position P1 to the movement position P2 denotes an offset distance. The offset distance is a distance on the captured image Gs, and is represented as the number of pixels, for example. In the present embodiment, a relationship between the offset distance and the inverse number of the enlargement factor of the pixel at the specific position in the extraction frame W is known in advance as illustrated in FIG. 7 based on the characteristics of the lens. The enlargement factor of the pixel at the specific position in the extraction frame W simply increases as the offset distance of the display center line H increases.

The lower limit value is determined in advance by sensory assessment of human view based on a criterion of a limit value with which an end of the display image is displayed in an easily recognizable manner, for example. The lower limit value is set to be greater than the inverse number of the enlargement factor at the time the display center line H is located at the initial position P1.

It is determined in S150 whether an appearance rate, which is a rate (for example, represented by a percentage (%)) of the subject vehicle appearance region R1 included in the extraction frame W, is greater than an upper limit value (an acceptable value) (the appearance rate exceeds the upper limit value). When the appearance rate is equal to or less than the upper limit value, the processing returns to S130 (the processing in S130 to S150 is repeated). When the appearance rate is greater than the upper limit value, the processing proceeds to S160. The upper limit value is determined in advance by sensory assessment of human view in accordance with a criterion of a limit value with which a feeling of strangeness is not caused. In the present embodiment, it is assumed that the rate of the vehicle appearance region R1 simply increases as the offset distance of the display center line H increases.

An offset distance ds of the display center line H at one previous position (a position returned by the amount corresponding to the unit pixel in the horizontal direction) Ps with respect to a present position of the display center line H is stored in S160 (referring to FIG. 9). The previous position is specified since the acceptable value is exceeded at the present position. When the processing proceeds to S160 after the determination that the inverse number of the enlargement factor is less than the lower limit value, the previous position corresponds to a position at which the inverse number of the enlargement factor is the minimal value that is equal to or greater than the lower limit value (that is, a limit position in the acceptable range). Similarly, when the processing proceeds to S160 after the determination that the appearance rate exceeds the upper limit value, the previous position corresponds to a position at which the appearance rate is the maximum value that is equal to or less than the upper limit value (that is, a limit position in the acceptable range). The extraction frame W at this time is set as an output frame Ws. Incidentally, the position of the display center line H at this time will be referred to as an output extraction position Ps.

In S170, a range, which is to be used as the display image, in the vertical direction (the upper-lower direction of the sheet paper) is set. In an example of the present embodiment, the range in the vertical direction is set so that the horizontal line Lh and the bumper 21 are included in the display image. It is assumed that the horizontal line Lh and the bumper 21 are included in the output frame Ws.

Incidentally, the horizontal line Lh and the bumper 21 are guides of a view angle in order to include an object on the ground in the display image, the horizontal line Lh itself does not necessarily appear in the captured image, and the horizontal line Lh may not be seen behind an object on the ground. A position of the horizontal line Lh in the captured image is calculated based on the camera parameters that are stored in the storage portion 20. A position of the bumper 21 in the captured image is calculated based on the camera parameters stored in the storage portion 20 and the 3D information indicating the outline shape of the vehicle in the same manner as the vehicle appearance region R1.

Figure 8:
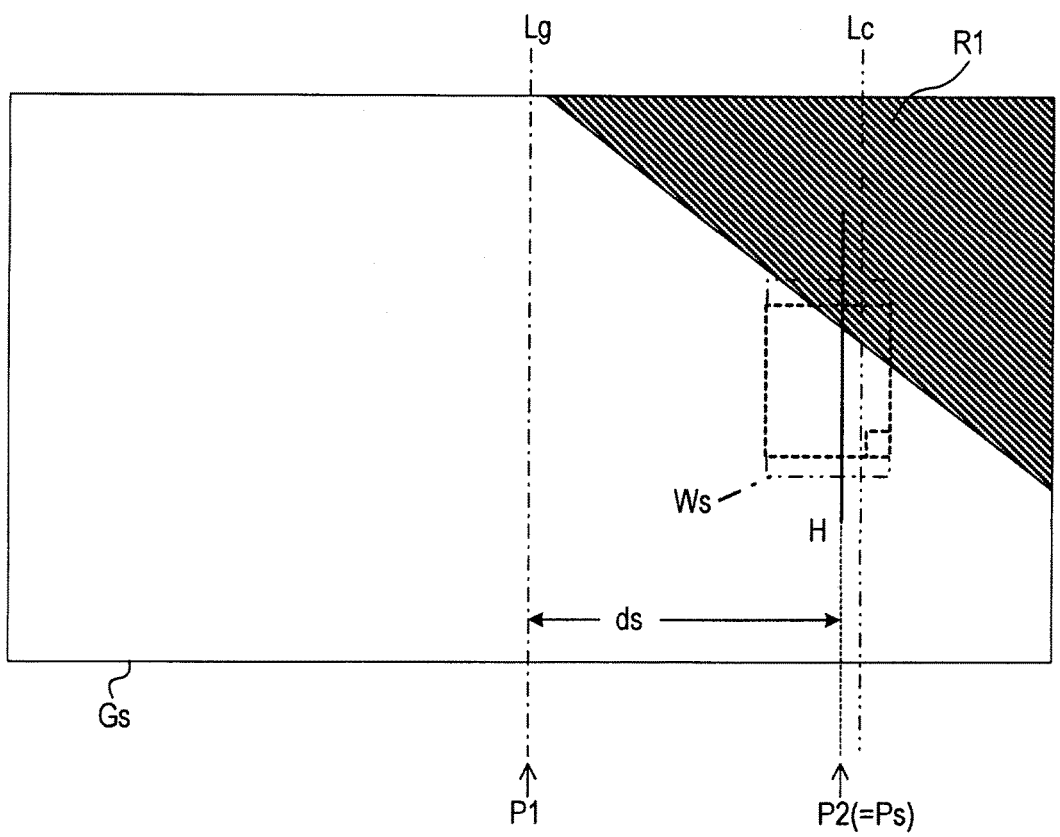
FIG. 8 is a diagram illustrating enlargement of the output frame in the captured image in a vertical direction.

When the horizontal line Lh or the bumper 21 is not included in the output frame Ws, a frame obtained by extending the output frame Ws in the vertical direction (an upper-lower direction) so as to include the horizontal line Lh and the bumper 21 is set as a new output frame Ws (a frame illustrated by a two-dotted chain line in FIG. 8).

Figure 2B:
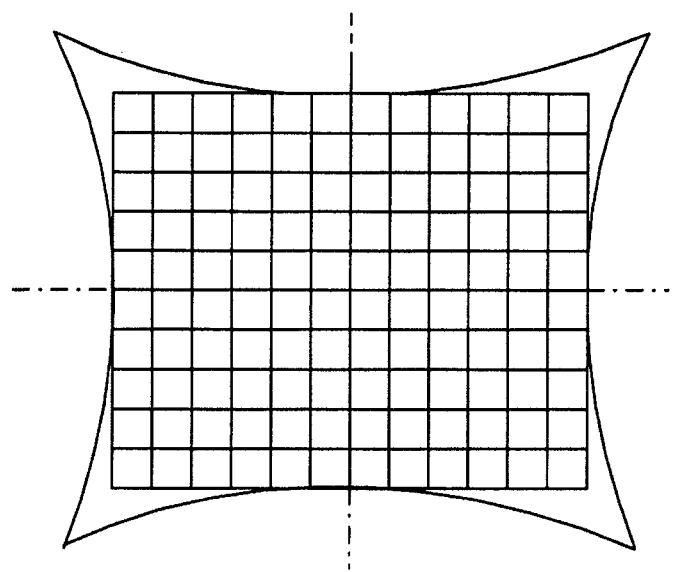
FIG. 2B is a diagram illustrating a regular image obtained by performing a distortion correction on the distorted image of FIG. 2A.

In S180, distortion correction is performed on the image in the output frame Ws. Since a method of performing the distortion correction on the distorted image is known, a description will be omitted. It is supposed that the output frame Ws has a square shape. In this case, the image after the distortion correction does not have a precise square shape and has a shape that four corners are extended outward toward diagonal line directions (referring to FIG. 2B). Therefore, cutting or masking processing is performed on a portion, which is outside the square (the size of the display image), after the distortion correction in this step.

In S190, a view point conversion processing is performed. The view point conversion processing is processing of converting the image obtained after the distortion correction in S180 into a virtual image captured by the imaging portion 10, in which camera parameters such as a pitch angle and a roll angle have been changed. Since various methods of a view point conversion processing are known, a description will be omitted.

Finally, the image obtained after the view point conversion processing in S190 is output to the display portion 40 in S200. Then, the processing is completed.

Effects

As described above, the control circuit 30 according to the present embodiment extracts, as a display image, a part of an image captured by the imaging portion 10 that is arranged at a position deviated from the vehicle center line as a center line of the vehicle 2 in the longitudinal direction. Specifically, the control circuit 30 determines an extraction position of the display image in the captured image, so that the center position of the display image is located to the vehicle center line as close as possible and the inverse number of the enlargement factor of the pixel at the specific position in the display image is equal to or greater than the predetermined lower limit value. When the inverse number of the enlargement factor is equal to or greater than the predetermined lower limit value, the degree of size reduction (an enlargement factor) is equal to or less than the inverse number of the lower limit value (corresponding to a first predetermined value).

Figure 9A:
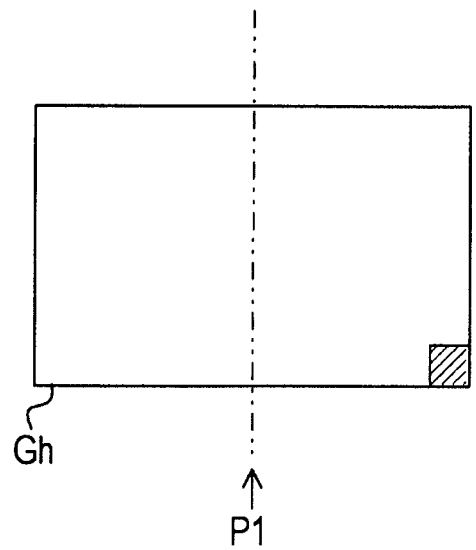
FIG. 9A is a diagram schematically illustrating, as a size of a hatched portion, an enlargement factor of a pixel at a specific position in a display image when a display center line is located at an initial position.
Figure 9B:
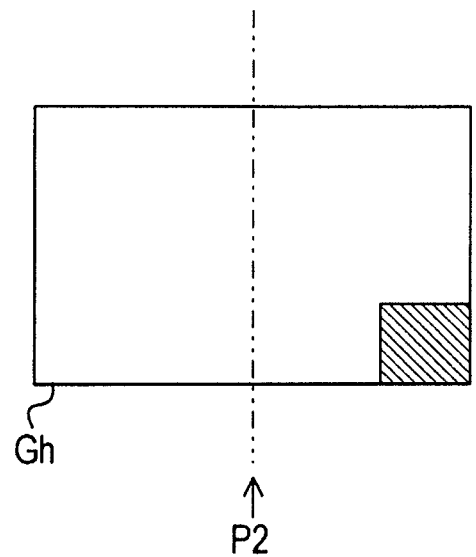
FIG. 9B is a diagram schematically illustrating, as a size of the hatched portion, an enlargement factor of the pixel at the specific position in the display image when the display center line is located at an output extraction position.

When the display center line H is located at the movement position P2 (referring to FIG. 9B), the enlargement factor of the pixel at the specific position (a right bottom corner) in a display image Gh is greater than that in the case in which the display center line H is located at the initial position P1 (referring to FIG. 9A) as schematically illustrated in FIG. 9A and FIG. 9B. As the enlargement factor increases, images at the end portions become more unclear and an image becomes less easily recognized by the occupant in the vehicle.

According to the present embodiment, the display center line H is set so as to be located to the vehicle center line Lc as close as possible while the enlargement factor of the pixel at the specific position is maintained so as not to cause difficulty in recognition by the occupant in the vehicle (S130, and S140). Accordingly, in the present embodiment, it may be possible to obtain a display image with a vertical center that coincides with the center of the vehicle to the maximum extent while resolution of the image is maintained to be equal to or greater than a predetermined level. Thus, it may be possible to generate a display image that can be easily recognized by the occupant in the vehicle.

In the present embodiment, the control circuit 30 periodically executes the image generation processing when the shift lever operated by the driver is at the reverse position (a rearward traveling). Even when the installation position of the camera in the imaging portion 10 may be deviated for some reason such as change due to aging, for example, it may be possible to, based on the camera parameters, obtain a display image that can be easily recognized by the occupant in the vehicle by updating the camera parameters to be stored in the storage portion 20 in accordance with the positional variations.

The control circuit 30 executes the processing (S150) of determining the extraction position of the display image in the captured image, so that the center position of the display image is located to the vehicle center line as close as possible and the appearance rate, which is a rate of appearance of the subject vehicle with respect to the entire display image, is equal to or less than the upper limit value (a second predetermined value). According to this configuration, it may be possible to prevent the appearance of the subject vehicle in the display image, in order for the occupant in the vehicle who views the display image not to have a feeling of strangeness.

The control circuit 30 sets a pixel, which is located at an end on the side of the vehicle center line in the horizontal direction of the captured image, as the pixel at the specific position. A pixel that is located at an end of the captured image in the vertical direction is set as the pixel at the specific position. The pixel at the specific position is set so as to be located on the bumper 21 side of the subject vehicle, which is captured in the captured image, in the vertical direction of the captured image. That is, in the present embodiment, a pixel at the right bottom corner of the output frame Ws is set as the pixel at the specific position. According to this configuration, it may be possible to prevent degradation in quality of the image in the vicinity of the subject vehicle, in particular, in the display image.

The control circuit 30 corresponds to an example of the image processing apparatus. The processing from S120 to S160 illustrated in FIG. 5 corresponds to an example of an extraction determination portion (or circuit or means) and an extraction determination step (or section). S180 corresponds to an example of a distortion correction portion (or circuit or means) and a distortion correction step (or section).

OTHER EMBODIMENTS

Although the embodiment of the present disclosure was described above, it is needless to state that the present disclosure is not limited to the embodiment and that various configurations can be employed. For example, functions of a single component may be distributed to multiple components, or functions of multiple components may be integrated in a single component. At least a part of the configuration in the embodiment may be replaced with a known configuration with the same function.

The extraction position of the display image in the captured image is determined (S120 to S160) and the distortion correction is performed (corresponding to S180) in the image generation processing according to the embodiment. An order of the processing is not limited. For example, distortion correction may be performed first on the captured image, and the same processing of determining the extraction position of the display image may be performed on the image after the correction. In this case, the processing in S180 (and S190) may be performed on the entire captured image after S100, and the processing in S110 and the following processing may be executed in the flowchart illustrated in FIG. 5, for example. In the embodiment, the size of the extraction frame W is appropriately changed in accordance with the position of the display center line H in order to cause the extraction frame W before the distortion correction to have the same size as the display image. In relation to this configuration, the size of the extraction frame W may be set to be constant regardless of the position of the display center line H in the present embodiment.

The vehicle appearance region R1 is obtained by calculation (S110) in the embodiment. The present disclosure is not limited. An image may be actually captured, and a correspondence relationship between an actual appearance region and the captured image may be specified in advance, for example, instead of performing the calculation. The correspondence relationship may be stored as a fixed value set in advance in the storage portion 20. In relation to this configuration, the same is true for the horizontal line Lh, the bumper 21, or the like, and correspondence relationships specified from an actual captured image may be stored.

Figure 10:
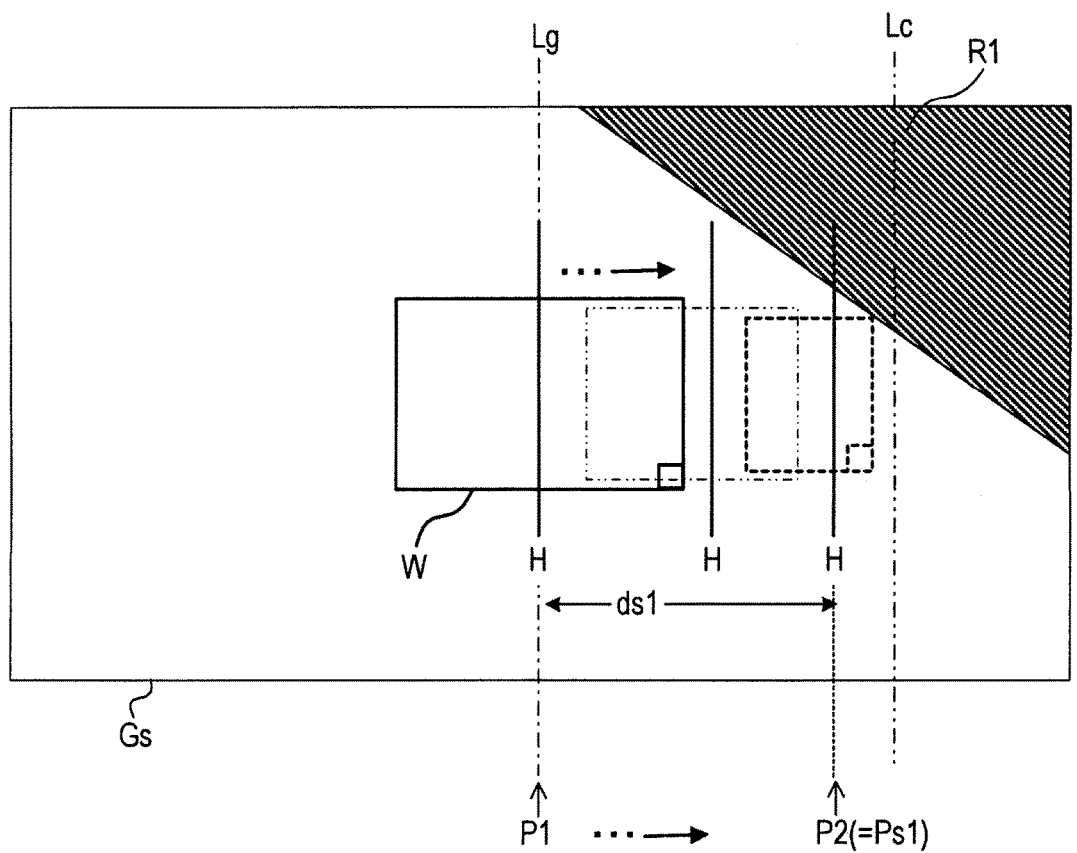
FIG. 10 is a diagram illustrating an output frame according to another embodiment in which appearance of a subject vehicle in a display image is not accepted.

Although the display center line H is set so as to accept the inclusion of the vehicle appearance region R1 in the display image (S150) in the embodiment, the present disclosure is not limited thereto. The display center line H may be set at an extraction position Ps1 so as not to include the vehicle appearance region R1 in the display image (referring to FIG. 10). An offset distance ds1 in such a case can be smaller than the offset distance ds illustrated in FIG. 6 (ds1≤ds).

The extraction frame W may be set in advance so as to include at least the bumper 21, may be set in advance so as to include at least the horizontal line Lh, or may be set in advance so as to include at least both the bumper 21 and the horizontal line Lh.

The extraction frame W is set to have a square shape in the embodiment. The shape of the extraction frame W is not limited. For example, the shape of the extraction frame W may be a distorted shape that is corrected to a square shape by distortion correction.

The size of the extraction frame W is changed in accordance with the movement in the horizontal direction in the embodiment. The present disclosure is not limited. The size of the extraction frame W may be fixed regardless of the movement in the horizontal direction.

The distortion correction is performed on the image in the output frame Ws (S180) in the embodiment. The present disclosure is not limited. An image obtained by uniformly enlarging the image in the output frame Ws (at the same enlargement factor for all pixels) so as to correspond to the size of the display image without performing the distortion correction may be used as the display image. Alternatively, the image in the output frame Ws may be output as the display image without being enlarged.

The image obtained after the view point conversion is used as the display image (S190) in the embodiment. The present disclosure is not limited. An image on which the view point conversion is not performed may be used as the display image.

Figure 5:
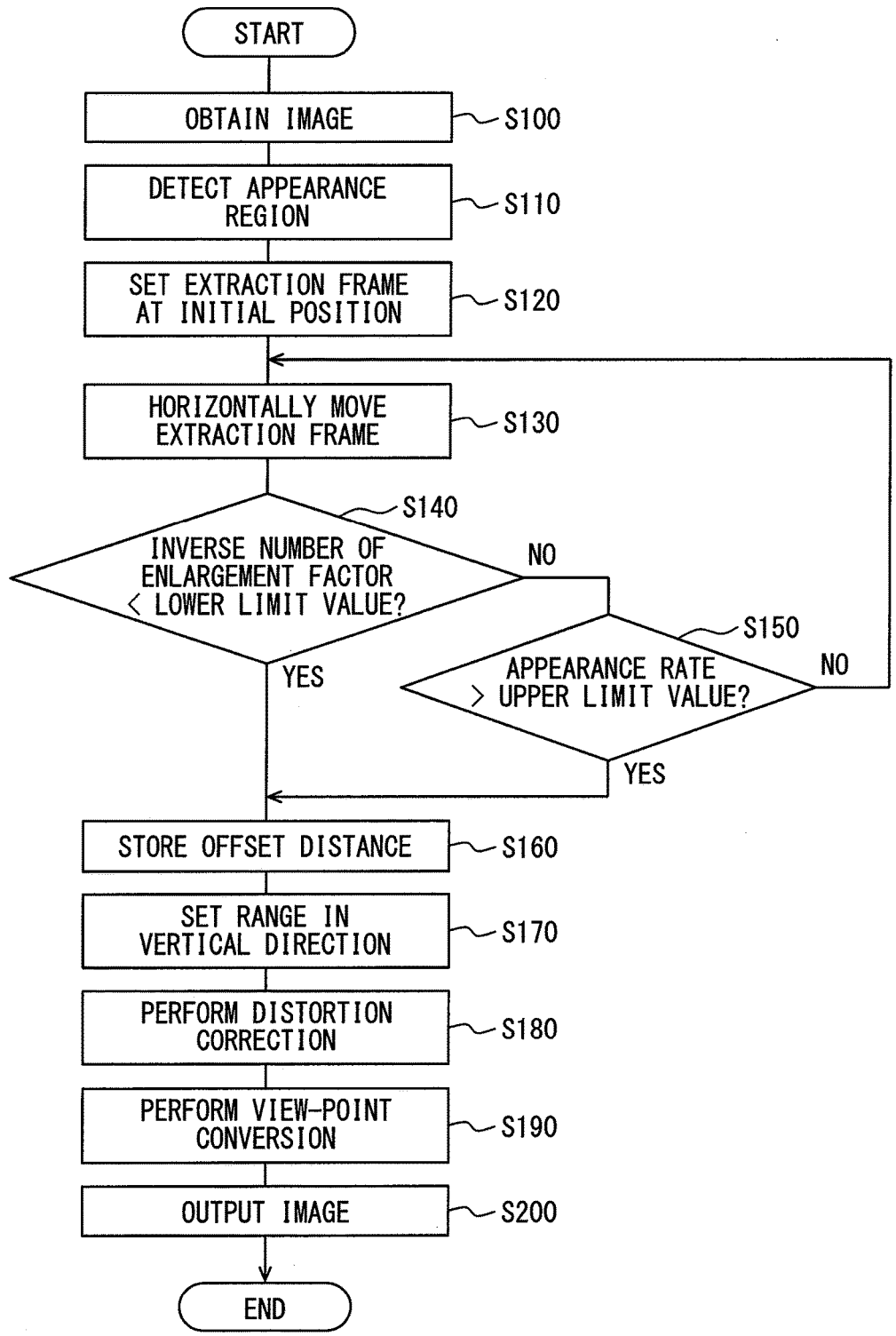
FIG. 5 is a flowchart representing an image generation processing executed by a control circuit.

The control circuit 30 periodically executes the image generation processing illustrated in FIG. 5 in the state in which the shift lever operated by the driver is at the reverse position (a rearward traveling) in the embodiment. The present disclosure is not limited. The control circuit 30 may be configured to execute the image generation processing in response to a command from an input device (not shown) that receives an input from the driver, for example. The input device may be configured of a touch panel that is installed in the display portion 40 or a mechanical key switch installed in the periphery of the display portion 40, for example. The control circuit 30 may be configured to execute the image generation processing in response to a command from an external device (not shown), for example, that receives an instruction from the outside.

The image processing apparatus according to the present disclosure extracts, as a display image, a part of an image captured by the wide angle camera that is arranged at a position deviated from the vehicle center line as the center line of the vehicle in the longitudinal direction.

In the image captured by the wide angle camera, a degree of size reduction of an object increases as being farther from the center of the captured image. The control circuit provided in the image processing apparatus determines the extraction position of the display image in the captured image in accordance with the center position of the display image with respect to the vehicle center line and a degree of size reduction of an object that is represented by a pixel at a specific position in the display image.

According to the image processing apparatus of the present disclosure, it may be possible to generate a display image that can be easily recognized by the occupant in the vehicle from an image captured by a wide angle camera that is arranged at a position deviated from the vehicle center line.

The present disclosure can be realized in the form of the image processing apparatus, and further, in various forms such as various systems including the apparatus as a component, a program for causing a computer to function as the respective means configuring the apparatus, a recording medium that records the program, and a communication control method.

Although embodiments, configurations, modes of the image processing apparatus and the image processing method according to the present disclosure were described as examples, embodiments, configurations, and modes of the present disclosure are not limited to the respective embodiments, the respective configurations, and the respective modes. Embodiments, configurations, and modes obtained by appropriately combining technical parts disclosed as different embodiments, configurations, and modes are also included within the scope of the embodiments, the configurations, and the modes of the present disclosure.

The invention claimed is:

1. An image processing apparatus that extracts a display image from a portion of an image captured by a wide angle camera, the wide angle camera being offset from a vehicle center line in a longitudinal direction, the wide angle camera causing a degree of size reduction of an object displayed within a captured image by the wide angle camera, the degree of size reduction of the object increasing as a distance between the object and a center of the captured image increases, the image processing apparatus comprising:
a control circuit that extracts the display image from the captured image,
wherein:
the control circuit includes an extraction determination portion,
the extraction determination portion determines an extraction position of the display image within the captured image according to a distance of a center position of the display image from the vehicle center line and the degree of size reduction of the object,
the center position of the display image is located as close as possible to the vehicle center line in a horizontal direction,
the degree of size reduction of the object is represented by a reduction in size of a pixel at a specific position within the display image, and the reduction in size of the pixel is equal to or less than a first predetermined value,
the extraction determination portion determines the extraction position of the display image within the captured image according to a state of an appearance of a subject vehicle in the display image, and
the extraction determination portion determines the extraction position of the display image within the captured image, and a ratio of the appearance of the subject vehicle within the display image is equal to or less than a second predetermined value.

2. The image processing apparatus according to claim 1, wherein:
the first predetermined value is less than the degree of size reduction of the object when the center position of the display image coincides with the vehicle center line.

3. The image processing apparatus according to claim 1, wherein:
the pixel at the specific position is located at an end of a vehicle center line side within the display image.

4. The image processing apparatus according to claim 3, wherein:
the pixel at the specific position is located at an end among pixels located at the end of the vehicle center line side.

5. The image processing apparatus according to claim 4, wherein:
the pixel at the specific position is located at an end of a bumper side of a subject vehicle in the captured image.

6. The image processing apparatus according to claim 1, further comprising:
a distortion correction portion that performs distortion correction of the captured image.

7. An image processing method that extracts a display image from a portion of an image captured by a wide angle camera, the wide angle camera being offset from a vehicle center line in a longitudinal direction, the wide angle camera causing a degree of size reduction of an object displayed within a captured image by the wide angle camera, the degree of size reduction of the object increasing as a distance between the object and a center of the captured image increases, the image processing method comprising:
an extraction determination step that determines an extraction position of the display image within the captured image according to a distance of a center position of the display image from the vehicle center line and the degree of size reduction of the object; and
a distortion correcting step that performs distortion correction of the captured image, wherein:
the center position of the display image is located as close as possible to the vehicle center line in a horizontal direction,
the degree of size reduction of the object is represented by a reduction in size of a pixel at a specific position within the display image, and the reduction in size of the pixel is equal to or less than a first predetermined value,
the extraction determination step determines the extraction position of the display image within the captured image according to a state of an appearance of a subject vehicle in the display image, and
the extraction determination step determines the extraction position of the display image within the captured image, and a ratio of the appearance of the subject vehicle within the display image is equal to or less than a second predetermined value.

8. The image processing apparatus according to claim 1, wherein:
the specific position in the display image is fixed at a set position.

9. An image processing apparatus that extracts a display image from a portion of an image captured by a wide angle camera, the wide angle camera being offset from a vehicle center line in a longitudinal direction, the wide angle camera causing a degree of size reduction of an object displayed within a captured image by the wide angle camera, the degree of size reduction of the object increasing as a distance between the object and a center of the captured image increases, the image processing apparatus comprising:
a control circuit that extracts the display image from the captured image,
wherein:
the control circuit includes an extraction determination portion,
the extraction determination portion determines an extraction position of the display image within the captured image according to a distance of a center position of the display image from the vehicle center line and the degree of size reduction of the object,
the center position of the display image is located as close as possible to the vehicle center line in a horizontal direction,
the degree of size reduction of the object is represented by a reduction in size of a pixel at a specific position within the display image, and the reduction in size of the pixel is equal to or less than a first predetermined value,
the extraction determination portion determines appearance rate of the subject vehicle, the appearance rate being a ratio of an appearance of the subject vehicle within the display image, and
the extraction determination portion determines the extraction position in the display image within the captured image so that the appearance rate of the subject vehicle is equal to or less than a second predetermined value.

\* \* \* \* \*